United States Patent Office 3,582,508
Patented June 1, 1971

3,582,508
RUBBER MODIFIED WITH ORGANIC POLYISO-
CYANATES IN PRESENCE OF PROMOTERS
Lester H. McIntosh, Jr., Mogadore, Ohio, assignor to
The Goodyear Tire & Rubber Company, Akron, Ohio
No Drawing. Continuation of application Ser. No.
625,933, Mar. 27, 1967. This application Nov. 28,
1969, Ser. No. 876,182
Int. Cl. C08c *11/00;* C08d *13/28*
U.S. Cl. 260—23.7
8 Claims

ABSTRACT OF THE DISCLOSURE

A composition and method of its preparation comprising the product of treating at least one rubber-like material selected from natural rubber and synthetic rubber with at least one polyisocyanate in the presence of at least one reaction promoter herein described wherein the composition is particularly useful in preparing a pressure sensitive adhesive. Representative of the reaction promoters are: lecithin, lead oleate, potassium oleate, dibutyltin di(2-ethylhexoate), dibutyltin dilaurate, triethylene diamine, N-methyl morpholine, N-ethyl morpholine, N,N,N',N'-tetramethylethylene diamine, and N,N,N',N'-tetramethyl-1,3-butane diamine.

---

The foregoing abstract is not to be taken as limiting the invention of this application and in order to understand the full nature and extent of the technical disclosure of this application reference must be made to the accompanying detailed description.

This invention relates to a method of modifying rubber-like materials and to the modified materials. More particularly, this invention relates to a method of modifying a rubber-like material with a polyisocyanate and to the modified material.

Various polyisocyanates can be used to modify natural rubber to form commercially useful materials. It is generally believed that the polyisocyanates react with the natural rubber to cause a partial crosslinking or curing of the rubber. The polyisocyanate-modified rubber is particularly applicable for the preparation of various adhesives. The reaction between the various polyisocyanates and the natural rubber is generally sufficiently fast to be suitable for a commercially useful process. However, where it is desired to similarly modify synthetic rubber-like materials it has been found that the various polyisocyanates react with the synthetic rubber-like materials at a rate too slow for a commercially useful process.

Therefore, it is an object of this invention to provide a method of modifying a rubber-like material with a polyisocyanate.

In accordance with this invention, it has been found unexpectedly that a method of modifying a rubber-like material comprises treating the rubber-like material with at least one polyisocyanate in the presence of at least one reaction promoter free of active hydrogens as determined by the Zerewitinoff method (Zerewitinoff, Ber. 40,2033- 1907) selected from the group consisting of tertiary amines, lead oleate, potassium oleate, dibutyltin di(2-ethylhexoate), dibutyltin dilaurate and lecithin. Various tertiary amines can be used as reaction promoters. Representative examples of the tertiary amines are triethylamine, triethylene diamine, N-methyl morpholine, N-ethyl morpholine, N,N,N',N'-tetramethylethylene diamine, and N,N,N',N'-tetramethyl-1,3-butane diamine.

The organic polyisocyanates used in this invention to modify the rubber-like materials include various organic diisocyanates, organic triisocyanates, polyisocyanates generally designated polyalkylene polyarylene isocyanates, and mixtures thereof. The organic polyisocyanates can be aromatic, aliphatic, or cycloaliphatic or combinations of these types.

Representative examples of such polyisocyanates include diisocyanates such as the toluene diisocyanates, m-phenylene diisocyanate, 4-chloro-1,3-phenylene diisocyanate, 4,4'-tetramethylene diisocyanate, 1,6-hexamethylene diisocyanate, 1,10-decamethylene diisocyanate, 1,4-cyclohexylene diisocyanate, 4,4'-methylene-bis (cyclohexylisocyanate) and 1,5-tetrahydronaphthalene diisocyanate; and triisocyanates such as triphenylmethane triisocyanate.

The polyisocyanates generally designated as polyalkylene polyarylene isocyanates are polyisocyanates and mixtures of polyisocyanates corresponding to the formula:

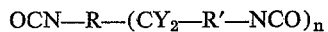

$$OCN—R—(CY_2—R'—NCO)_n$$

in which R and R' are arylene radicals, Y is selected from the group consisting of hydrogen, alkyl, and aryl radicals, $n$ is a whole number, and the ($CY_2$—R'—NCO) groups in excess of one are attached to an R' radical, said mixture comprising from 0% to about 70% by weight of the diisocyanate and from 100% to about 30% by weight of at least one polyisocyanate containing more than two —NCO equivalents per mol of polyisocyanate.

The generally preferred polyalkylene polyarylene isocyanates are polymethylene polyphenylisocyanates which are normally prepared by the phosgenation of an aromatic amine with an aldehyde or ketone reaction product. Some products that are particularly preferred are those made according to the teachings of U.S. Pat. 2,683,730. For instance, the commercial high and low viscosity products obtained by phosgenation of reaction products of aniline and formaldehyde and the rearrangement product thereof.

Various rubber-like materials and their mixtures can be modified in the presence of this invention, such as, for example, natural rubber and the various synthetic rubbers. Representative examples of the various synthetic rubbers are rubbery polymers and copolymers of conjugated dienes and copolymers of conjugated dienes and vinyl compounds such as styrene and acrylonitrile. Exemplary of the synthetic rubbery polymers are the rubbery polymers of isoprene, rubbery polymers of 1,3-butadiene; polychloroprene; the rubbery copolymers of butadiene and styrene which contain a major proportion of butadiene, particularly copolymers of butadiene and styrene of the hot and cold SBR type which contain from about 50 to about 99 percent by weight of butadiene; and rubbery copolymers of butadiene and acrylonitrile.

In the practice of this invention, the rubber-like material is treated with the polyisocyanate and reaction promoter by mixing the rubber-like material with the polyisocyanate in the presence of the reaction promoter. It is usually preferred to mix the reaction promoter with the rubber-like material before adding the polyisocyanate.

The amount of reaction promoter employed can be varied over a wide concentration. The optimum amount of the promoter depends upon a number of factors such as the types of rubber-like materials, polyisocyanates and reaction promoters used as well as temperature and the rate and degree of treatment desired. Those skilled in the art will readily determine the optimum amount of reaction promoter to use. Suitable treatments can be conducted for various purposes wherein the concentration of the reaction promoter is from about 0.05 to about 10 parts or more of the promoter per 100 parts (phr.) by weight of the rubber-like material.

Usually from about 0.3 to about 30 parts and preferably from about .6 to about 5 parts by weight of the polyisocyanate per 100 parts by weight of the polymer are used.

A wide range of temperatures can be used for the treatment of this invention such as from about 10° C. to about 100° C. although a range of from about 20° C. to 50° C. is usually more preferable.

Various compounding aids, reinforcing agents, carbon blacks, and extending resins and oils which do not adversely affect the treatment of this invention can be mixed with the rubber-like material.

If desired, the rubber-like material can be first dissolved in a solvent to provide a solution comprising up to about 50 weight percent or more of the rubber-like material, although other concentrations of the rubber-like material can be used. It is usually preferred that the polymer concentration in the solution is adjusted so that the viscosity of the solution is less than about 20,000 centipoises to facilitate easy mixing under normal conditions although solutions of higher viscosities can be used with special mixing equipment.

Any of the organic solvents and their mixtures normally used to dissolve the rubber-like materials which are non-reactive with the polyisocyanates and the reaction promoters of this invention can be used to dissolve the rubber-like materials of this invention. Generally, aromatic, substituted aromatic, aliphatic, and substituted aliphatic hydrocarbons and their halogen and nitrogen derivatives are used as solvents. Representative of the organic solvents are toluene, benzene, chlorobenzene, xylene, gasoline, kerosene, carbon tetrachloride, dichloro-ethylene, and nitropropane.

It is understood that if the modified rubber-like material is to be used as an adhesive, particularly as a pressure sensitive adhesive, resinous tackifiers can be added to the rubber-like material to enhance the tack of the modified rubber-like material. The tackiness of the adhesive can generally be referred to as the property of the adhesive which enables it to form a bond of measurable strength immediately upon contact with another surface when brought in contact under moderate pressure. Tack is thus an "instantaneous" adhesion and differs from ultimate strength. The amount of tack can be measured by the amount of force required to separate the two pieces of material during a short period of time and by the time for such a separation when a fixed amount of force is applied. Testing of adhesives in shear by tension is a popular test. When a tackifier is used, from about 50 to about 150 parts and usually from about 80 to 100 parts by weight of the tackifier is used per 100 parts (phr.) of the rubber-like material.

Representative examples of well-known resinous tackifiers are thermoplastic resinous materials having softening points of from about 20° C. to about 150° C., molecular weights of from about 200 to about 1500, and structures that are large and rigid such as resins comprising copolymers of 1,3 - pentadiene and 2 - methyl-2-butene having softening points of from about 80° C. to about 110° C. as exemplified in U.S. patent application Ser. No. 556,293, filed June 9, 1966, now abandoned; and various modified wood rosins, polyterpene resins, coumarone-indene resins, and phenolic-modified coumarone-indene resins referred to on pp. 199–201 of the Handbook of Adhesives, by Irving Skeist, copyright 1962, published by the Reinhold Publishing Corporation, Library of Congress Catalogue Card Number 62–18033.

The following examples further illustrate the invention and are not intended to be limiting. In these examples, parts and percentages are by weight unless otherwise indicated.

EXAMPLE 1

A solution containing 80 percent by weight of hexane and 20 percent by weight of a stereospecific 1,4-polymer of isoprene having a cis configuration content of about 96 percent and a Mooney (ML–4 at 212° F.) value of about 27 was prepared by mixing the polymer and hexane for about 26 hours at about 25° C. The 1,4 polymer of isoprene had been milled for about 10 minutes on a cold rubber mill to increase its plasticity. To the solution was added one part of a substituted phenolic type of antioxidant per 100 parts (phr.) of the polymer. The solution had a viscosity of about 3600 centipoises (cps.). The viscosity of this solution and the viscosity of solutions hereinafter determined in the following examples were measured at about 25° C. with a Brookfield Viscometer, Model LVT, using Spindle No. 4 at 12 revolutions per minute (r.p.m.).

(A) To a portion of the solution was added 5 phr. of triphenylmethane triisocyanate in a solution containing 20 percent of the triisocyanate and 80 percent methylene chloride. After stirring for 10 minutes at about 25° C. the mixture had a viscosity of 3550 cps. A portion of the mixture was flowed onto a glass plate and dried at about 25° C. The dried polymer had the appearance of uncured polyisoprene. After storing the remainder of the mixture for 48 hours at about 25° C. it had a viscosity of about 3800 cps.

(B) To another portion of the solution was mixed 0.2 phr. of triethylene diamine. To this mixture was then added 5 phr. of the triphenyl methane triisocyanate in its 20 percent solution in methylene chloride. After mixing for 10 minutes at about 25° C. the mixture had a viscosity of 4000 cps. A portion of the mixture was flowed onto a glass plate and dried at about 25° C. The dried polymer was easily stripped off the glass plate and had the appearance of a cured rubber. After storing the remainder of the mixture for about 48 hours at about 25° C. it had a viscosity of about 9000 cps.

EXAMPLE 2

A solution containing 20 percent by weight of No. 1 smoked sheet natural rubber having a Mooney value (ML–4 at 212° F.) of 24, and about 80 percent by weight of toluene was prepared by mixing the rubber and toluene for about 48 hours at about 25° C. The natural rubber had been milled for about 10 minutes on a cold rubber mill to increase its plasticity. To the solution was added 1 phr. of a substituted phenolic antioxidant. The resulting mixture had a viscosity of about 13,400 cps.

(A) To a portion of the solution was added 5 phr. of triphenylmethane triisocyanate in a solution containing 20 percent of the triisocyanate and 80 percent methylene chloride. After stirring for 10 minutes at about 25° C. the mixture had a viscosity of about 12,400 cps. A portion of the mixture was flowed onto a glass plate and dried at about 25° C. The dried polymer had the appearance of cured natural rubber. After storing the remainder of the mixture for 7 hours at about 25° C. it had a viscosity of about 23,800 cps.

(B) To another portion of the solution was mixed 0.2 phr. of triethylene diamine. To this mixture was then added 5 phr. of the triphenylmethane triisocyanate in its 20 percent solution in methylene chloride. After stirring for 10 minutes at about 25° C. the mixture had a viscosity of about 11,100 cps. A portion of the mixture was flowed onto a glass plate and dried at about 25° C. The dried modified natural rubber polymer was easily stripped off the glass plate and had the appearance of a cured rubber. Using standard physical test procedures, ultimate percent elongation and tensile strength (pounds per square inch) comparative measurements were made on the milled unmodified natural rubber and on the modified natural rubber polymer with the following results:

|  | Tensile strength | Elongation |
| --- | --- | --- |
| Natural rubber | 10.3 | 860 |
| Modified natural rubber | 1,286 | 823 |

After storing the remainder of the mixture for about 1 hour and 15 minutes at about 25° C., a measurement of the mixture's viscosity could not be taken with the No. 4 Spindle of the Brookfield Viscometer at 12 r.p.m., which indicated that the viscosity of the mixture was above 50,000 cps.

EXAMPLE 3

A solution containing 20 percent of a polymer of isoprene of the type used in Example 1 and 80 percent of toluene was prepared by mixing the polymer and the toluene for about 16 hours at about 25° C. The polymer of isoprene had been milled for about 10 minutes on a cold rubber mill to increase its plasticity. To the solution was added 1 phr. of a substituted phenolic antioxidant.

(A) To a portion of the solution was added 5 phr. of triphenylmethane triisocyanate in a solution containing 20 percent of the triisocyanate and 80 percent methylene chloride. After stirring for 10 minutes the mixture had a viscosity of about 18,300 cps. A portion of the mixture was flowed onto a glass plate and dried at about 25° C. The dried polymer had the appearance of uncured polyisoprene. After storing the remainder of the mixture for 48 hours at about 25° C. it had a viscosity of about 20,000 cps.

(B) To another portion of the solution was mixed 0.2 phr. of triethylene diamine. To this mixture was then added 5 phr. of the triphenylmethane triisocyanate in its 20 percent solution in methylene chloride. After mixing for 10 minutes at about 25° C. the mixture had a viscosity of 19,500 cps. A portion of this mixture was flowed onto a glass plate and dried at about 25° C. The dried modified isoprene polymer was easily stripped off the glass plate and had the appearance of a cured rubber. Using standard physical test procedures, ultimate percent elongation and tensile strength (pounds per square inch), comparative measurements were made on the milled unmodified isoprene polymer and on the modified isoprene polymer with the following results:

|  | Tensile strength | Elongation |
| --- | --- | --- |
| Isoprene polymer | Too soft for testing | |
| Modified isoprene polymer | 24.3 | 1,140 |

After storing the remainder of the mixture for about 6 hours at about 25° C. it had a viscosity of about 32,000 cps.

EXAMPLE 4

A solution containing 82.5 percent by weight of toluene and 17.5 percent by weight of a cold-type butadiene-styrene rubber comprising about 76.5 percent by weight butadiene and about 23.5 percent by weight bound styrene and having a Mooney (ML-4 at 212° F.) value of about 35 was prepared by mixing the polymer and toluene for about 16 hours at about 25° C. To the solution was added one part of a substituted phenolic antioxidant per 100 parts phr. of the polymer.

(A) To a portion of the solution was added 5 phr. of triphenylmethane triisocyanate in a solution containing 20 percent of the triisocyanate and 80 percent methylene chloride. After stirring for 10 minutes at about 25° C. the mixture had a viscosity of 3,250 cps. A portion of the mixture was flowed onto a glass plate and dried at about 25° C. The dried polymer had the appearance of uncured butadiene-styrene rubber. After storing the remainder of the mixture for 4 hours at about 25° C. it had a viscosity of about 3,500 cps. After further storage of the mixture for a total of 48 hours at about 25° C., it had a viscosity of 4000 cps.

(B) To another portion of the solution was mixed 0.2 phr. of triethylene diamine. To this mixture was then added 5 phr. of the triphenylmethane triisocyanate in its 20 percent solution in methylene chloride. After mixing for 10 minutes at about 25° C. the mixture had a viscosity of 3,600 cps. A portion of the mixture was flowed onto a glass plate and dried at about 25° C. The dried polymer was easily stripped off the glass plate and had the appearance of a partially cured rubber. After storing the remainder of the mixture for about 4 hours at about 25° C. it had a viscosity of about 4,500 cps. After further storage of the mixture for a total of 48 hours at about 25° C., it had a viscosity of 6,700 cps.

EXAMPLE 5

Various polymeric mixtures suitable as pressure sensitive adhesives were prepared by the following method: First, a solution was prepared containing 20 percent by weight of a polymer of isoprene of the type used in Example 1 and 80 percent by weight of toluene by mixing the polymer and toluene for about 16 hours at about 25° C. The polymer of isoprene had been milled on a cold rubber mill for about 10 minutes to increase its plasticity. With the solution was mixed 1 phr. of a substituted phenolic antioxidant and 100 phr. of a resinous tackifier (a polyterpene resin having a melting point of 115° C.), obtained as ST-5115 from The Schenectady Chemical Company. Portions of this solution were then used to prepare the various pressure sensitive adhesive mixtures. The recipes of the various mixtures and their corresponding solution viscosities are shown above (the triphenylmethane triisocyanate was used as a solution containing 20 percent of the triisocyanate and 80 percent methylene chloride):

|  | Viscosity (cps.) after— | | |
| --- | --- | --- | --- |
| Compounds mixed with the polymer solution at about 25°C. | 10 minutes mixing at about 25° C. | 6 hours storage at about 25° C. | 24 hours storage at 25° C. |
| (A) 1 phr. of triphenylmethane triisocyanate | 3,900 | 3,700 | 3,650 |
| (B) 0.1 phr. of dibutyltindilaurate followed by 1 phr. of triphenylmethane triisocyanate | 3,750 | 4,200 | 6,500 |
| (C) 0.5 phr. of tetramethylethylene diamine followed by 1 phr. of triphenylmethane triisocyanate | 4,500 | 7,900 | 7,900 |
| (D) 0.5 phr. of tetramethylbutane diamine followed by 1 phr. of triphenylmethane triisocyanate | 3,600 | 5,500 | 14,000 |
| (E) 1 phr. of triethylamine followed by 1 phr. triphenylmethane triisocyanate | 3,750 | 5,900 | 9,400 |
| (F) 2.2 phr. of N-methyl morpholine followed by 1 phr. triphenylmethane triisocyanate | 3,750 | 5,000 | 7,200 |
| (G) 0.1 phr. triethylene diamine followed by 1 phr. triphenylmethane triisocyanate | 3,700 | 6,000 | 13,200 |

Adhesive mixtures (A), (B), and (G) of Example 5 were submitted to the shear adhesion test prescribed by the Pressure Sensitive Tape Council. Test samples were prepared by applying a coating of the adhesive mixture immediately after its preparation (i.e. immediately after adding the polyisocyanate and mixing for 10 minutes at about 25° C.) to a portion of one side of a strip of Mylar film (a polyester film obtained from Du Pont de Nemours & Company) and dried for various periods of time before testing. As prescribed by the Tape Council, the prepared pressure-sensitive adhesive surface of the Mylar film was pressed under a moderate pressure onto a stainless steel test panel. The stainless steel panel was placed on a rack so that the portion of the Mylar film strip without the adhesive coating hung downward from the panel. A 500 gram weight was secured to the end of the film extending downward and the shear adhesion of the sample was determined by the time required for the adhesive coated film to separate from the stainless steel panel under the 500 gram load. For further information as to the prescribed test, reference may be made to the Pressure Sensitive Tape Council publication "Test Methods for Pressure Sensitive Tapes," Shear Adhesion Test PSTC-2, Third Edition, issued August 1955, revised May 1959, by the Pressure Sensitive Tape Council, 1201 North Waukegan Road, Glenview, Ill., U.S.A.

The following results were obtained by testing adhesive mixtures (A), (B) and (G) according to the Shear Adhesion Test:

| Adhesive mixtures of Example 5 | Drying time after preparation | Shear adhesion (minutes) |
|---|---|---|
| (A) | 3 hours at about 25° C | 102 |
| (A) | 24 hours at about 25° C | 148 |
| (A) | 96 hours at about 25° C | 7, 200 |
| (B) | 20 minutes at 70° C | >20, 000 |
| (G) | 3 hours at about 25° C | >20, 000 |

EXAMPLE 6

Various polymeric mixtures suitable as pressure sensitive adhesives were prepared by the following method: First, a solution was prepared containing 20 percent by weight of a polymer of isoprene of the type used in Example 1 and 80 percent by weight of toluene by mixing the polymer and toluene for about 16 hours at about 25° C. The polymer of isoprene had been milled for about 10 minutes on a cold rubber mill to increase its plasticity. With the solution was mixed 1 phr. of a substituted phenolic antioxidant and 100 phr. of a resinous tackifier (a polyterpene resin having a melting point of 115° C.), obtained as ST–5115 from the Schenectady Chemical Company. Portions of this solution were then used to prepare the various pressure sensitive adhesive mixtures. The recipes of the various mixtures and their corresponding solution viscosities are shown below (with the exception of toluene diisocyanate, the polyisocyanates were used as solutions containing 20 percent of the polyisocyanate and 80 percent methylene chloride):

| Compounds mixed with the polymer solution at about 25°C. | Viscosity (cps.) after— | | |
|---|---|---|---|
| | 10 minutes mixing at about 25° C. | 6 hours storage at about 25° C. | 24 hours storage at about 25° C. |
| (A) 0.1 phr. of triethylene diamine followed by 1 phr. of triphenylmethane triisocyanate | 11,300 | 19,600 | [1] Gelled |
| (C) 0.1 phr. of triethylene diamine followed by 1 phr. polymethylene polyphenyl isocyanate [2] | 10,500 | 13,800 | 17,000 |
| (C) 0.1 phr. of triethylene diamine followed by 1 phr. toluene diisocyanate | 10,700 | 10,800 | [3] 12,400 |

[1] The mixture was too viscous to obtain a measurement of viscosity by the No. 4 spindle of the Brookfield viscometer at 12 r.p.m. which indicated that the viscosity of the mixture was above 50,000 cps.
[2] The polymethylene polyphenyl isocyanate was a phosgenated reaction product of aniline and formaldehyde to yield a polyisocyanate containing at least 3 and more isocyanate groups per molecule and containing about 40 to 45 percentm ethylene diphenyl diisocyanate.
[3] After 48 hours of storage at about 25° C. the viscosity of the mixture was 14,100 cps.

As shown in the preceding examples the rate of reaction of the rubber-like material and the polyisocyanate in the presence of a small amount of the reaction promoter is surprisingly substantially higher than the rate of reaction of the rubber-like material and the polyisocyanate. This is clearly evidenced by the rate of increase of the viscosity of these respective mixtures where the rubber-like material is dissolved in an organic solvent prior to treatment.

The rubber-like materials modified by the method of this invention generally have physical characteristics of at least partially cured elastomeric polymers. The modified rubber-like materials of this invention are particularly applicable for preparing pressure sensitive adhesives. Such pressure sensitive adhesives can be used to bond various materials together such as paper, wood, plastics, textile fabrics, cured natural rubber, cured synthetic rubber, glass and metals.

Also, as particularly shown in Example 5, the rubber-like materials modified by treatment with a polyisocyanate in the presence of the reaction promoter are not the same composition as the composition prepared by treating the rubber-like material with the polyisocyanate without the reaction promoter wherein the use of a very small amount of the reaction promoter increased the shear adhesion of the composition by at least 10,000 percent, where the composition has been dried for a period of three hours before testing.

While certain representative embodiments and details have been shown for the purpose of illustrating the invention, it will be apparent to those skilled in this art that various changes and modifications may be made therein without departing from the spirit or scope of the invention.

What is claimed is:

1. A method of preparing a composition comprising treating a rubber-like material selected from natural rubber and synthetic rubber with at least one organic polyisocyanate at a temperature of from about 10° C. to about 100° C. in the presence of at least one reaction promoter selected from the group consisting of lecithin, lead oleate, potassium oleate, dibutyltin di(2-ethylhexoate), dibutyltin dilaurate, triethylene diamine, N-methyl morpholine, N-ethyl morpholine, N,N,N',N'-tetramethylethylene diamine, and N,N,N',N'-tetramethyl-1,3-butane diamine, wherein the said synthetic rubber is selected from the group consisting of rubbery polymers and copolymers of conjugated dienes and copolymers of conjugated dienes with vinyl compounds selected from the group consisting of styrene and acrylonitrile, and where from about 0.3 to about 30 parts by weight of the polyisocyanate and from about 0.5 to about 10 parts by weight of the reaction promoter are used per 100 parts by weight of the rubber-like material and wherein the said rubber-like material is treated as a solution having a viscosity of less than about 20,000 centipoises in an organic solvent essentially non-reactive with the said polyisocyanate and reaction promoter.

2. The method of claim 1 wherein the synthetic rubber is selected from the group consisting of rubbery polymers of isoprene, 1,3-butadiene, rubbery copolymers of 1,3-butadiene and styrene and rubbery copolymers of 1,3-butadiene and acrylonitrile.

3. The method of claim 2 wherein the polyisocyanate is selected from the group consisting of organic diisocyanates, organic triisocyanates, polyalkylene polyarylene isocyanates, and mixtures thereof.

4. The method of claim 1 which comprises treating a mixture comprising the rubber-like material and a resinous tackifier dissolved in an organic solvent with at least one polyisocyanate in the presence of at least one of the reaction promoters.

5. The method according to claim 1 where the said reaction promoters are selected from the group consisting of lead oleate, dibutyltin di(2-ethylhexoate), and dibutyltin dilaurate, and the polyisocyanate is selected from the group consisting of organic diisocyanate, organic triisocyanates, polyalkylene polyarylene isocyanates and their mixtures and where the said rubber-like material is treated in the presence of an organic solvent non-reactive with the polyisocyanates and reaction promoters.

6. The method according to claim 5 where the polyisocyanate is a polyalkylene polyarylene isocyanate having the structure of a polyisocyanate prepared by the phosgenation of an aromatic amine with an aldehyde or ketone reaction product.

7. A method of preparing the composition of claim 1 comprising treating the rubber-like material with at least one organic polyisocyanate at a temperature of from about 10° C. to about 100° C. in the presence of at least one reaction promoter selected from lecithin and reaction promoters free of active hydrogens, as determined by the Zerewitinoff method, selected from the group consisting of lead oleate, potassium oleate, dibutyltin di(2-ethylhexoate), dibutyltin dilaurate, triethylene diamine, N-methyl morpholine, N-ethyl morpholine, N,N,N',N'-tetramethylethylene diamine, and N,N,N',N'-tetramethyl-1,3-butane diamine, wherein the said rubber-like material is selected from the group consisting of natural rubber and synthetic rubber selected from rubbery polymers and copolymers of conjugated dienes and copolymers of conjugated dienes with vinyl compounds selected from the group consisting of styrene and acrylonitrile, and where from about 0.3 to about 30 parts by weight of the polyisocyanate and from about 0.5 to about 10 parts by weight of the reaction promoter are used per 100 parts by weight of the rubber-like material.

8. The method of claim 7 comprising treating a mixture comprising 100 parts by weight of the rubber-like material dissolved in an organic solvent, and from about 0.05 to about 10 parts by weight of the reaction promoter, with from about 0.5 to about 30 parts by weight of the polyisocyanate.

References Cited

UNITED STATES PATENTS 2,555,745   6/1951   Hopkins et al. ----- 260—77.5X
3,350,362  10/1967   Potts et al. ---------- 260—77.5

OTHER REFERENCES

Polyurethanes: Chemistry and Technology by Saunders and Frisch pp. 129 to 134 (1962).

DONALD E. CZAJA, Primary Examiner

D. J. BARRACK, Assistant Examiner

U.S. Cl. X.R.

117—122; 260—3, 27, 32.4, 33.6, 33.8, 77.5, 94.7, 752, 755, 767, 829, 887, 894